(12) United States Patent
Myatlev et al.

(10) Patent No.: US 11,608,986 B2
(45) Date of Patent: Mar. 21, 2023

(54) COMBUSTOR NOZZLE ENHANCING SPATIAL UNIFORMITY OF PRE-MIXTURE AND GAS TURBINE HAVING SAME

(71) Applicant: DOOSAN ENERBILITY CO., LTD., Changwon-si (KR)

(72) Inventors: Alexander Myatlev, Gimhae-si (KR); Yunyoung Doh, Changwon-si (KR); Borys Shershnyov, Changwon-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 45 days.

(21) Appl. No.: 16/792,319

(22) Filed: Feb. 17, 2020

(65) Prior Publication Data

US 2020/0309377 A1 Oct. 1, 2020

(30) Foreign Application Priority Data

Apr. 1, 2019 (KR) .......................... 10-2019-0037847

(51) Int. Cl.
*F23R 3/28* (2006.01)
*F02C 7/22* (2006.01)

(52) U.S. Cl.
CPC ................ *F23R 3/286* (2013.01); *F02C 7/22* (2013.01); *F05D 2240/35* (2013.01)

(58) Field of Classification Search
None
See application file for complete search history.

(56) References Cited

U.S. PATENT DOCUMENTS 5,794,449 A * 8/1998 Razdan .................. F23R 3/286
 60/737
6,438,961 B2 8/2002 Tuthill et al.
6,655,145 B2 12/2003 Boardman
(Continued)

FOREIGN PATENT DOCUMENTS

DE 102008022669 A1 11/2008
EP 1918638 A1 5/2008
(Continued)

OTHER PUBLICATIONS

Office Action issued by Japan Patent Office dated Dec. 3, 2020.
(Continued)

*Primary Examiner* — Arun Goyal
(74) *Attorney, Agent, or Firm* — Harvest IP Law LLP

(57) ABSTRACT

A combustor nozzle and a combustor for a gas turbine including the same are provided. The combustor nozzle may include a plurality of vanes disposed radially on an outer circumferential surface thereof, each vane including an internal cavity to which fuel is supplied, wherein the vane may include an airfoil in cross-section, wherein at least one of a pressure surface and/or a suction surface of the airfoil is disposed in a height direction thereof with a plurality of nozzle holes communicating with the cavity, wherein the vane may include a V-shaped nozzle hole including a pair of outlets on both sides of the airfoil based on a leading edge of the airfoil, wherein the V-shaped nozzle hole may form an angle ($\alpha$) diverging outward with respect to a horizontal plane across the leading edge, and an acute angle ($\beta$) radially outward with respect to a vertical plane perpendicular to the horizontal plane.

18 Claims, 9 Drawing Sheets

(56) References Cited

U.S. PATENT DOCUMENTS

| | | |
|---|---|---|
| 6,688,109 B2 | 2/2004 | Hein |
| 8,302,404 B2 | 11/2012 | Nilsson et al. |
| 8,925,323 B2 | 1/2015 | Zuo |
| 2002/0174656 A1 | 11/2002 | Hein |
| 2003/0115884 A1 | 6/2003 | Boardman |
| 2008/0095622 A1 | 4/2008 | Naik |
| 2008/0276622 A1* | 11/2008 | Johnson .................. F23R 3/36 60/800 |
| 2010/0077760 A1 | 4/2010 | Laster et al. |
| 2013/0086910 A1* | 4/2013 | Khan ..................... F23R 3/36 60/737 |
| 2016/0177837 A1 | 6/2016 | Uhm et al. |
| 2019/0128131 A1* | 5/2019 | Sener .................. F01D 17/162 |
| 2019/0257521 A1* | 8/2019 | Sadasivuni .............. F23R 3/14 |

FOREIGN PATENT DOCUMENTS

| | | |
|---|---|---|
| JP | 2003513223 A | 4/2003 |
| JP | 2005180799 A | 7/2005 |
| JP | 2006336996 A | 12/2006 |
| JP | 2008275308 A | 11/2008 |
| JP | 2010107186 A | 5/2010 |
| JP | 2010159951 A | 7/2010 |
| JP | 4719059 B2 | 7/2011 |
| JP | 2014219198 A | 11/2014 |
| KR | 20130087640 A | 8/2013 |
| KR | 20160071791 A | 6/2016 |
| KR | 1020160139406 A | 12/2016 |
| KR | 1020170003049 A | 1/2017 |
| KR | 1020170014900 A | 2/2017 |
| KR | 101885413 B1 | 8/2018 |
| KR | 20190004613 A | 1/2019 |
| KR | 20190005362 A | 1/2019 |

OTHER PUBLICATIONS

Office Action issued by German Patent Office dated Apr. 21, 2021.
Office Action issued by Japan Patent Office.

* cited by examiner

COMBUSTOR NOZZLE ENHANCING SPATIAL UNIFORMITY OF PRE-MIXTURE AND GAS TURBINE HAVING SAME

CROSS REFERENCE TO RELATED APPLICATION

This application claims priority to Korean Patent Application No. 10-2019-0037847, filed on Apr. 1, 2019, the entire disclosure of which is incorporated herein by reference in its entirety.

FIELD

Apparatuses and methods consistent with exemplary embodiments relate to a combustor nozzle and a combustor for a gas turbine including the same, and more particularly to a combustor nozzle having improved premixing uniformity of fuel and air in a vane region thereof and a gas turbine including the same.

BACKGROUND

A gas turbine combustor serves to mix an air compressed by a compressor with fuel, combust the air-fuel mixture at constant pressure to produce combustion gas with high energy, and transmit the combustion gas to a turbine, which in turn converts heat energy of the combustion gas into mechanical energy.

The combustor has a structure in which an air compressed by the compressor is mixed with fuel in a combustor casing and ignited and combusted in a combustion chamber inside a liner. For example, the compressed air flowing along an outer surface of a tube assembly of the combustor is fed toward a combustor nozzle and enters into the annular combustor casing to mix with the fuel.

The fuel may be supplied through several routes, one of which is through vanes having an airfoil cross-section radially provided on the outer surface of the combustor nozzle. That is, compressed air is supplied into an annular space between the combustor nozzle and a shroud surrounding the same, and fuel is injected through a plurality of nozzle holes formed in the vanes disposed in the annular space, thereby pre-mixing air and fuel and transmitting the pre-mixture to the combustion chamber.

However, due to the structure of the vanes disposed in the narrow annular space, the number of nozzle holes is limited. In particular, due to technical and design limitations (e.g., a limitation in processing technology, a strength condition to cope with heat load or vibration, etc.), disposing the nozzle holes in close proximity to the shroud is very limited.

In terms of the cross-sectional area of the annular space, although the area of an outer region of the vane close to the shroud is larger, the premix uniformity in the outer region tends to be thinner than other regions due to the placement limitation of the nozzle holes.

As such, if the mixing ratio of the outer region of the vane becomes thinner, the mixing ratio in other regions becomes locally thick, resulting in poor premix uniformity in the vanes. Highly heterogeneous pre-mixed air-fuel mixtures lead to combustion in homogeneities, which cause adverse effects such as increased combustion vibration and increased emissions including e.g. carbon monoxide and nitrogen oxides.

SUMMARY

Aspects of one or more exemplary embodiments provide a combustor nozzle capable of improving the air-fuel pre-mixing uniformity performed in vanes disposed radially on an outer surface of the combustor nozzle.

Additional aspects will be set forth in part in the description which follows and, in part, will become apparent from the description, or may be learned by practice of the exemplary embodiments.

According to an aspect of an exemplary embodiment, there is provided a combustor nozzle including: a plurality of vanes disposed radially on an outer circumferential surface thereof. Each vane may include an internal cavity to which fuel is supplied. The vane may include an airfoil in cross-section, wherein at least one of a pressure surface and/or a suction surface of the airfoil may be disposed in a height direction thereof with a plurality of nozzle holes communicating with the cavity. The vane may include a V-shaped nozzle hole having a pair of outlets on both sides of the airfoil based on a leading edge of the airfoil, wherein the V-shaped nozzle hole may form an angle ($\alpha$) diverging outward with respect to a horizontal plane across the leading edge.

The V-shaped nozzle hole may form an acute angle ($\beta$) radially outward with respect to a vertical plane perpendicular to the horizontal plane.

The pair of outlets of the V-shaped nozzle hole may be symmetrical with respect to the leading edge.

A center of the outlets of the V-shaped nozzle hole may be located in the radially outermost nozzle hole among the plurality of nozzle holes.

The V-shaped nozzle hole may be a straight hole having a constant cross section.

The V-shaped nozzle hole may be a diffuser hole of which a cross section gradually increases towards the outlet.

A center of the angle ($\alpha$) formed by the V-shaped nozzle hole diverging outwards with respect to the horizontal plane across the leading edge may be located in the cavity, and two flow paths formed by the outlets of the V-shaped nozzle hole may be separated from each other.

The angle ($\alpha$) of the V-shaped nozzle hole formed with respect to the horizontal plane across the leading edge may be in a range of 70 to 180 degrees.

The angle ($\beta$) of the V-shaped nozzle hole formed with respect to the vertical plane across the leading edge may be in a range of 20 to 50 degrees.

The angle ($\alpha$) of the V-shaped nozzle hole formed with respect to the horizontal plane across the leading edge may be in a range of 70 to 180 degrees, and the angle ($\beta$) of the V-shaped nozzle hole formed with respect to the vertical plane across the leading edge may be in a range of 20 to 50 degrees.

According to an aspect of another exemplary embodiment, there is provided a combustor for a gas turbine including: a plurality of burners disposed along an annular combustor casing. Each burner may include combustor nozzle injecting fuel to mix with compressed air, a plurality of vanes disposed radially on an outer circumferential surface of the combustor nozzle, each vane including a cavity to which the fuel is supplied, and a shroud surrounding the combustor nozzle to form an annular space receiving the vanes. The vane may include an airfoil in cross-section, wherein at least one of a pressure surface and/or a suction surface of the airfoil is disposed in a height direction thereof with a plurality of nozzle holes communicating with the cavity The vane may include a V-shaped nozzle hole including a pair of outlets on both sides of the airfoil based on a leading edge of the airfoil, wherein the V-shaped nozzle hole may form an angle ($\alpha$) diverging outward with respect to a horizontal plane across the leading edge.

The V-shaped nozzle hole may form an acute angle (β) radially outward with respect to a vertical plane perpendicular to the horizontal plane.

The pair of outlets of the V-shaped nozzle hole may be symmetrical with respect to the leading edge.

A center of the outlets of the V-shaped nozzle hole may be located in the radially outermost nozzle hole among the plurality of nozzle holes.

The V-shaped nozzle hole may be a straight hole having a constant cross section.

The V-shaped nozzle hole may be a diffuser hole of which a cross section gradually increases towards the outlet.

A center of the angle (α) formed by the V-shaped nozzle hole diverging outwards with respect to the horizontal plane across the leading edge may be located in the cavity, and two flow paths formed by the outlets of the V-shaped nozzle hole may be separated from each other.

The angle (α) of the V-shaped nozzle hole formed with respect to the horizontal plane across the leading edge may be in a range of 70 to 180 degrees.

The angle (β) of the V-shaped nozzle hole formed with respect to the vertical plane across the leading edge may be in a range of 20 to 50 degrees.

The angle (α) of the V-shaped nozzle hole formed with respect to the horizontal plane across the leading edge may be in a range of 70 to 180 degrees, and the angle (β) of the V-shaped nozzle hole formed with respect to the vertical plane across the leading edge may be in a range of 20 to 50 degrees.

According to one or more exemplary embodiments, because the combustor nozzle includes the V-shaped nozzle hole which forms a radially outward inclination while two flow paths, i.e. outlets diverge in a V-shape, stratification of the air-fuel ratio distribution is alleviated along all the circumferential and radial directions, thereby obtaining an effect of improving the premixed state in which uniformity of the air-fuel ratio is improved.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
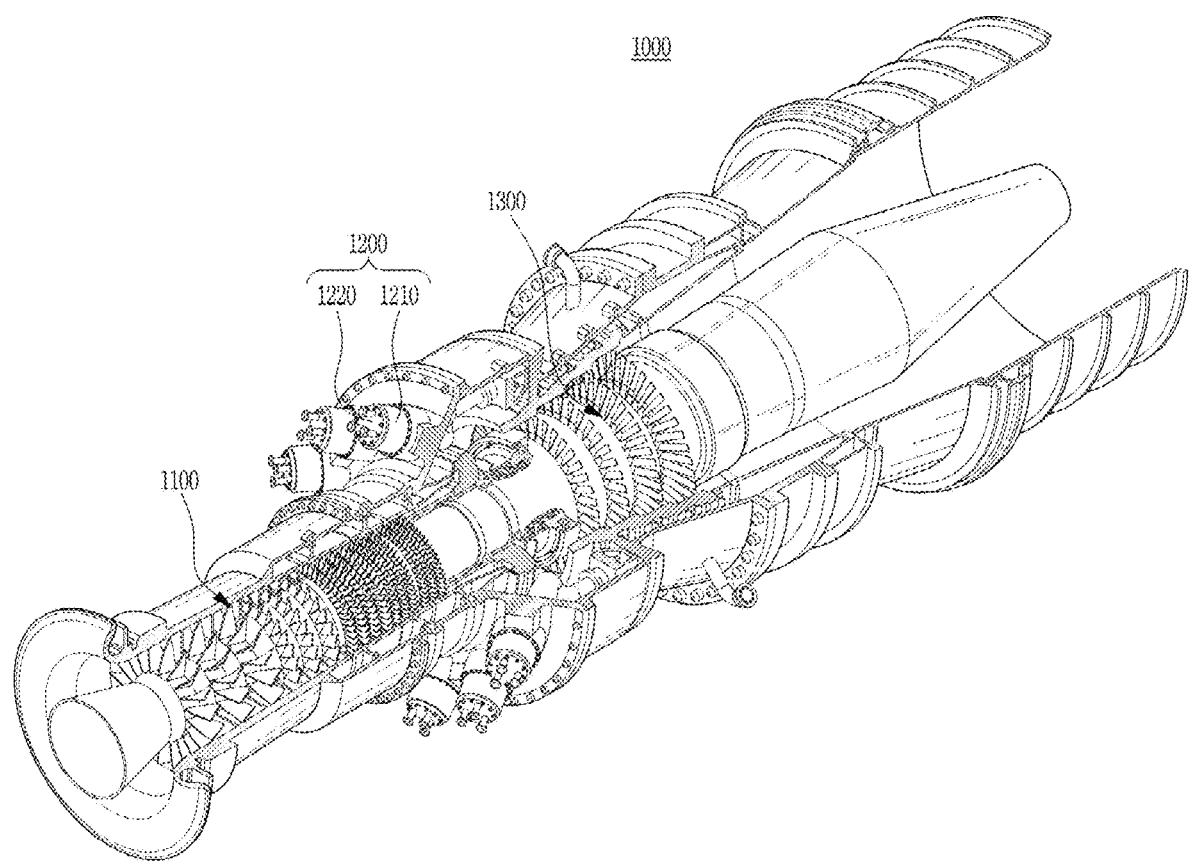
FIG. 1 is a view illustrating an overall structure of a gas turbine in accordance with an exemplary embodiment.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

It should be understood that terms concerning attachments, coupling and the like, such as "connected" and "coupled" refer to a relationship wherein structures are secured or attached to one another either directly or indirectly through intervening structures.

Hereinbelow, it is understood that expressions such as "at least one of a, b or c" and "a, b, and/or c" means only a, only b, only c, both a and b, both a and c, both b and c, all of a, b, and c, or variations thereof.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
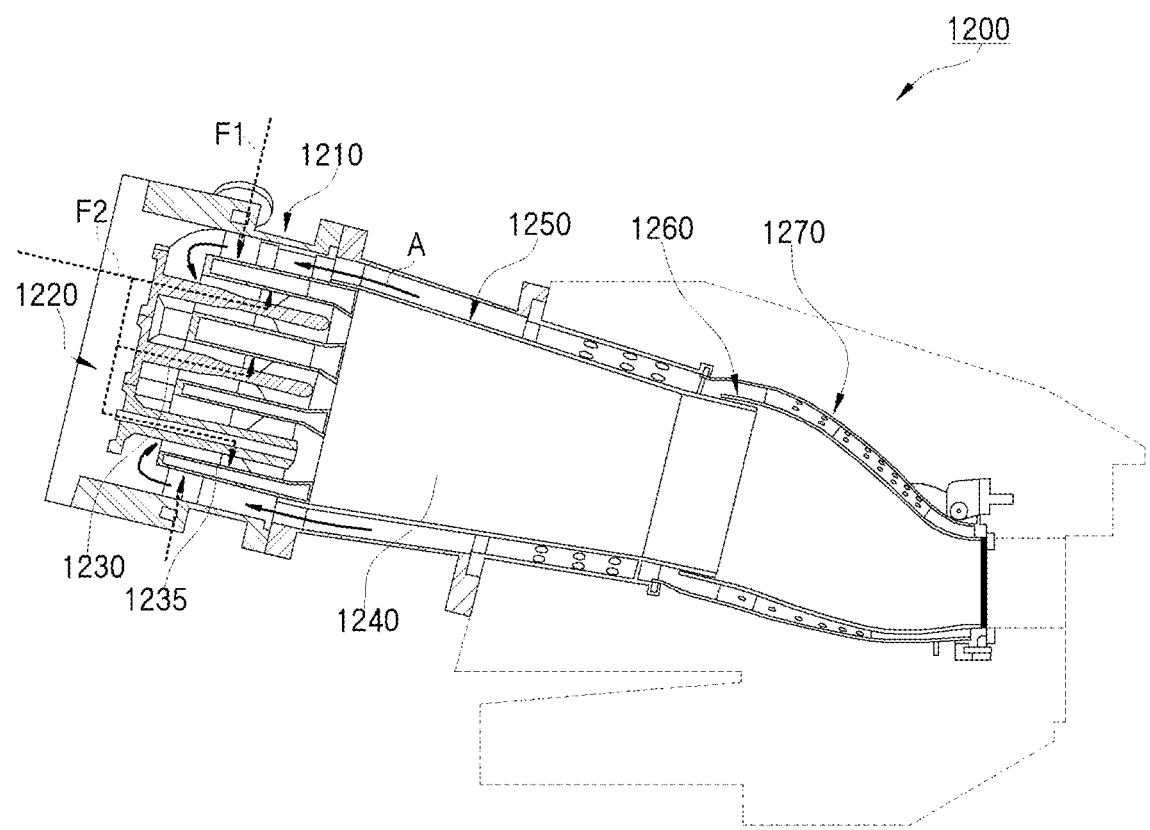
FIG. 2 is a view illustrating a flow of premixed air in a combustor of a gas turbine in accordance with an exemplary embodiment.

FIG. 1 is a schematic view illustrating an internal structure of a gas turbine 1000 in accordance with an exemplary embodiment, and FIG. 2 is a view illustrating a flow of premixed air in a combustor of a gas turbine.

An ideal thermodynamic cycle of a gas turbine may comply with a Brayton cycle. The Brayton cycle consists of four thermodynamic processes including an isentropic compression (i.e., adiabatic compression) process, an isobaric combustion process, an isentropic expansion (i.e., adiabatic expansion) process, and an isobaric heat rejection process.

That is, in the Brayton cycle, gas turbine may draw air from the atmosphere, compress the air to a high pressure air, combust air-fuel mixture at constant pressure to discharge a thermal energy, expand this high-temperature combustion gas to convert the thermal energy of the combustion gas into a kinetic energy, and discharge exhaust gas containing remaining energy to the atmosphere. As such, the Brayton cycle may consist of four thermodynamic processes including compression, heating, expansion, and heat ejection.

Embodying the Brayton cycle, the gas turbine 1000 may include a compressor, a combustor, and a turbine, as illustrated in FIG. 1. Although the following description will be made with reference to FIG. 1, the description of the present disclosure may be widely applied to other turbine engines having a configuration equivalent to that of the gas turbine 1000 illustrated in FIG. 1.

Referring to FIG. 1, the compressor 1100 of the gas turbine 1000 may draw an air from the outside and compresses the air. The compressor 1100 may supply the compressed air for combustion to a combustor 1200 and supply the compressed air for cooling to a high temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 of the gas turbine 1000 may be designed in the form of a centrifugal compressor or an axial compressor. Generally, the centrifugal compressor is applied to a small-scale gas turbine. On the other hand, a multi-stage axial compressor is applied to a large-scale gas turbine such as the gas turbine 1000 illustrated in FIG. 1 so as to compress a large amount of air. A rotary shaft of the compressor 1100 and a rotary shaft of the turbine 1300 are directly connected to each other so that the compressor 1100 is driven using some of the power output from the turbine 1300.

The combustor 1200 may mix the compressed air supplied from the compressor 1100 with fuel and combust the mixture at a constant pressure to produce combustion gas having high energy. FIG. 2 illustrates an example of the combustor 1200 provided in the gas turbine 1000. The combustor 1200 is disposed downstream of the compressor 1100 such that a plurality of burners 1220 are disposed along an inner circumference of a combustor casing 1210. The burners 1220 each includes several combustor nozzles 1230, through which fuel is sprayed into and mixed with air in a proper ratio to form a fuel-air pre-mixture suitable for combustion.

The gas turbine 1000 may use a gaseous fuel, a liquid fuel, or hybrid fuel formed by a combination thereof. It is important to form combustion conditions suitable for reducing the amount of exhaust gas such as carbon monoxide and nitrogen oxides. Although control of combustion is relatively difficult compared to diffusion combustion, a pre-mixed combustion scheme which allows uniform combustion temperature to advantageously reduce the localized high temperature region where nitrogen oxides are generated has been used increasingly to achieve exhaust gas regulation.

In the pre-mixed combustion, compressed air is mixed with fuel ejected from the combustor nozzle 1230 in advance, and then enters into a combustion chamber 1240. The pre-mixed gas is initially ignited by an igniter, and then the combustion is maintained by supplying a mixture of fuel and air, after the combustion is stabilized.

Because the combustor 1200 has a high temperature environment in the gas turbine 1000, the combustor 1200 needs suitable cooling. Referring to FIG. 2, compressed air flows towards the combustor nozzle 1230 along an outer surface of a pipe assembly which includes a duct assembly and a flow sleeve 1270. The duct assembly includes a liner 1250 and a transition piece 1260 to connect the burner 1220 and the turbine 1300 so that high-temperature combustion gas flows therethrough. The duct assembly heated by the high-temperature combustion gas may be properly cooled while the compressed air flows along the outer surface of the pipe assembly.

High temperature and high pressure combustion gas generated by the combustor 1200 is supplied to the turbine 1300 through the duct assembly. In the turbine 1300, the combustion gas undergoes adiabatic expansion and impacts and drives a plurality of blades arranged radially around a rotary shaft so that thermal energy of the combustion gas is converted into mechanical energy with which the rotary shaft rotates. A portion of the mechanical energy obtained from the turbine 1300 is supplied as the energy required to compress the air in the compressor, and the remaining is utilized as an available energy to drive a generator to produce electric power.

As described above, the combustor 1200 has a structure in which compressed air supplied from the compressor 1100 is mixed with fuel in a region of a combustor casing 1210 and a burner 1220 to form a pre-mixture, which is ignited and combusted in a combustion chamber 1240 inside a liner 1250. Referring to FIG. 2, the compressed air A having flowed toward the combustor 1300 along an annular space between the liner 1250 and a flow sleeve 1270, which constitute a duct assembly, enters into the combustor casing 1210 to mix with the fuel F1. The mixing of fuel and air is performed through several independent routes. In FIG. 2, the fuel is injected from the vanes of the combustor nozzle through the route, through which a second fuel F2 is injected, so that a pre-mixture is produced between the annular space between the shroud and the combustor nozzle.

However, due to the structure of the vanes disposed in the narrow annular space, the number of nozzle holes is limited. In particular, due to technical and design limitations, disposing the nozzle holes in close proximity to the shroud is very limited. As such, because the premix uniformity of the outer region of the vane in proximity to the shroud becomes thinner than in other regions, such highly heterogeneous pre-mixed air-fuel mixtures lead to combustion in homogeneities.

Figure 3:
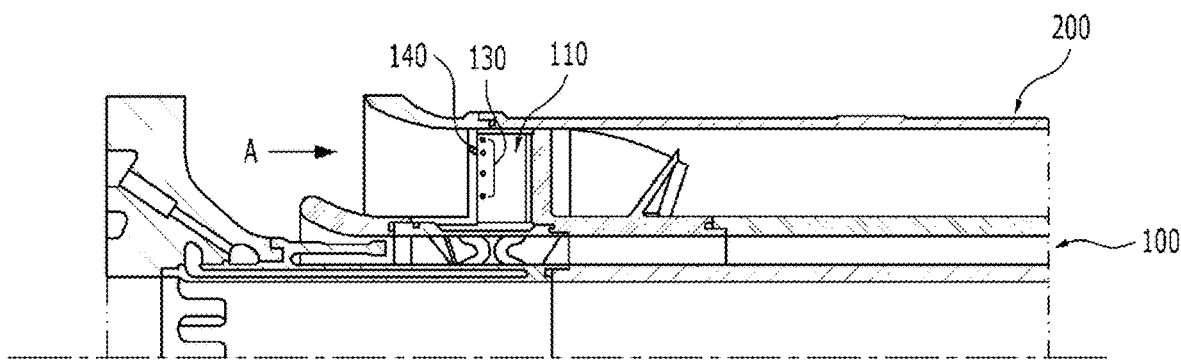
FIG. 3 is a cross-sectional view illustrating a structure in which a combustor nozzle is disposed in a shroud in accordance with an exemplary embodiment.
Figure 4:
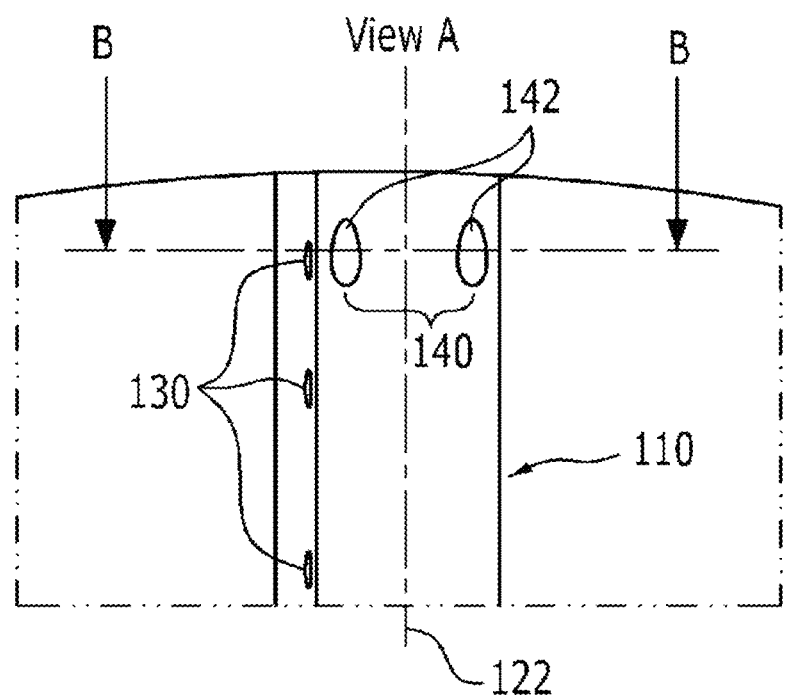
FIG. 4 is a view illustrating vanes seen from the direction "A" of FIG. 3 in accordance with an exemplary embodiment.
Figure 5:
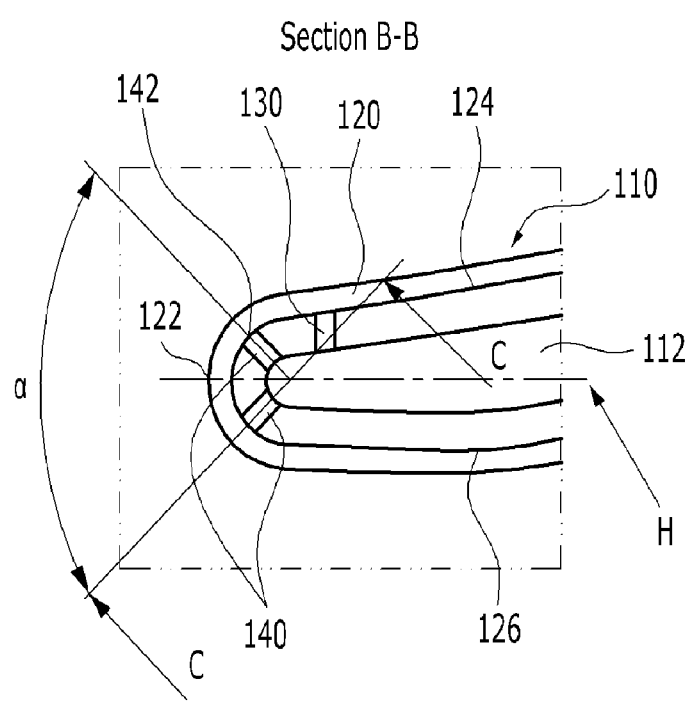
FIG. 5 is a cross-sectional view taken along line "B-B" of FIG. 4 in accordance with an exemplary embodiment.
Figure 6:
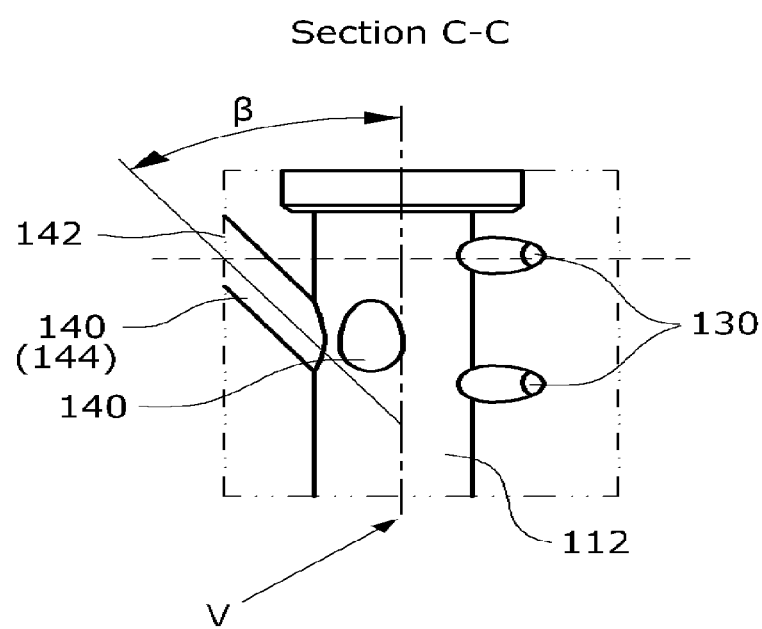
FIG. 6 is a cross-sectional view taken along line "C-C" of FIG. 5 in accordance with an exemplary embodiment.

FIG. 3 is a cross-sectional view illustrating a structure in which a combustor nozzle 100 according to an exemplary embodiment is disposed in a shroud 200, FIG. 4 is a view illustrating vanes 110 seen from a direction "A" of FIG. 3, FIG. 5 is a cross-sectional view taken along line "B-B" of FIG. 4, and FIG. 6 is a cross-sectional view taken along line "C-C" of FIG. 5. The combustor nozzle 100 will be described in detail with reference to the above-described drawings.

The combustor nozzle 100 may include a plurality of vanes 110 disposed radially on an outer circumferential surface thereof, and the vane 110 internally includes a cavity 112 to be supplied with fuel. That is, the combustor nozzle 100 may have any kind of combustor nozzle without particular limitation as long as the combustor nozzle 100 includes the vanes 110 in which premixing of air and fuel is caused.

In the combustor nozzle 100, the vane 110 has an airfoil 120 in cross-section to allow air to flow smoothly. In this case, at least one of a pressure surface 124 and/or a suction surface 126 of the cross section of the airfoil 120, that is, the pressure surface 124 and/or the suction surface 126 may include a plurality of nozzle holes 130 communicating with the cavity 112. Therefore, the fuel supplied to the cavity 112 of the vane 110 is injected into the air flow through the nozzle holes 130 having a small diameter, thereby premixing air and fuel. For example, the nozzle hole 130 shown on the left side in FIG. 4 facing the vane 110 in the direction "A" of FIG. 3 is because the pressure surface 124 is seen from the front side due to the shape of the airfoil 120 of the vane 110.

The plurality of nozzle holes 130 are equally disposed along a height direction of the pressure surface 124 or the suction surface 126 to make as uniform equivalence air-fuel ratio (EQ) distribution as possible along a radial direction around the vane 110. Further, as the vanes 110 are evenly disposed radially on the outer circumferential surface of the combustor nozzle 100, a uniform air-fuel ratio distribution also appears along the circumferential direction. However, due to the structure of the vanes 110 disposed in the narrow annular space between the combustor nozzle 100 and the shroud 200, the number of nozzle holes 130 is limited, and in particular, disposing the nozzle holes 130 in close proximity to the shroud 200 is very limited. As such, the premix uniformity of the outer region of the vane 110 in proximity to the shroud 200 readily becomes thinner than in other regions.

The exemplary embodiment may further include a nozzle hole having a special structure in order to alleviate the non-uniformity of the air-fuel ratio distribution. The nozzle hole may be a V-shaped nozzle hole 140 including a pair of outlets 142 on both sides from a leading edge 122 of the airfoil 120.

The V-shaped nozzle hole 140 is illustrated in a three-dimensional arrangement structure in FIGS. 4 to 6. Because the nozzle hole 140 has an overall V-shaped form in the arrangement structure, the nozzle hole 140 is referred to as a "V-shaped nozzle hole" 140.

Referring to FIG. 4, the V-shaped nozzle hole 140 includes a pair of outlets 142 on both sides thereof based on the leading edge 122 of the airfoil 120. That is, the V-shaped nozzle hole 140 has two flow paths, which are distributed on both sides of the air foil 120 based on the leading edge 122. The dividing of the outlets 142 on both sides of the leading edge 122 of the airfoil 120 is such that a uniform fuel mixing (i.e., circumferential fuel mixing) in the region between the vanes 110 is accomplished in consideration of the air flow being divided into the pressure surface 124 part and the suction surface 126 part based on the leading edge 122 as a boundary line.

In addition, the respective outlets 142 of the V-shaped nozzle hole 140 faces the air flow, and thus the fuel injected from the V-shaped nozzle hole 140 hits the air flow so that mutual mixing is promoted.

Here, the pair of outlets 142 of the V-shaped nozzle hole 140 may be symmetrical with respect to the leading edge 122 so as not to be biased to either side for even premixing.

Two flow paths of the V-shaped nozzle hole 140 are disposed on the vane 110 to form angles in two directions in three dimensions. One relates to the angle formed by the V-shape, that is, the angle between the two flow paths. To express this, the V-shaped nozzle hole 140 may form an angle $\alpha$ diverging outward on a horizontal line H crossing the leading edge 122 in a horizontal direction, which angle is shown in FIG. 5.

Referring to FIG. 5, the angle $\alpha$ at which the two flow paths open specifies the flow characteristics of the fuel flowing from the cavity 112 toward the outlet 142 and the impact angle for the air flow. Taking into account design goals such as whether either of equal distribution of fuel, flexible flow, or effective collision angles for air flow is prioritized, or all of them are properly harmonized, the angle $\alpha$ formed on the horizontal line H crossing the leading edge 122 in the horizontal direction may be determined in the range of 70 to 180 degrees.

In addition, a center C of the angle $\alpha$ formed by the V-shaped nozzle hole 140 outward on the horizontal plane across the leading edge 122 is located in the cavity 112 rather than in the thickness of the vane 110. Accordingly, forming the two flow paths of the V-shaped nozzle hole 140 to be separated from each other may be desirable in terms of allowing the smooth flow and distribution of the fuel to occur at the inlet of the flow path.

Further, the V-shaped nozzle hole 140 may form another angle that forms an acute angle $\beta$ radially outward with respect to a vertical line V crossing the leading edge 122 in a vertical direction. This acute angle β is shown in FIG. 6. By this acute angle β, the V-shaped nozzle hole 140 forms an angle inclined to the shroud 200, which is distinguished from the case in which the plurality of nozzle holes 130 formed along the height direction at least one of the pressure surface 124 and/or the suction surface 126 of the airfoil 120 are formed horizontally.

Having the V-shaped nozzle hole 140 form the acute angle β radially outward with respect to the vertical line V crossing the leading edge 122 in a vertical direction is for compensating for the problem that the air-fuel ratio is sparsely formed in the region close to the shroud 200. The V-shaped nozzle hole 140 causes a fuel injection toward the shroud 200 to create a richer fuel distribution than in the related art, thereby reducing the non-uniformity of the air-fuel ratio distribution. The acute angle $\beta$ on the vertical line V crossing leading edge 122 in a the vertical direction may be in the range of 20 to 50 degrees.

It is understood that although the V-shaped nozzle hole 140 forms the acute angle $\beta$ that faces radially outward, the position of the outlet 142 may not be limited thereto, and may be changed or vary according to one or more other exemplary embodiments. Because the nozzle hole 130 and the V-shaped nozzle hole 140 are inwardly machined (for example, electric discharge machined) from the outside of the vane 110, the outlet 142 of the V-shaped nozzle hole 140 should be located properly. For example, the center of the outlet 142 of the V-shaped nozzle hole 140 may be arranged so as not to exceed the radially outermost nozzle hole 130 among the plurality of nozzle holes.

Figure 7:
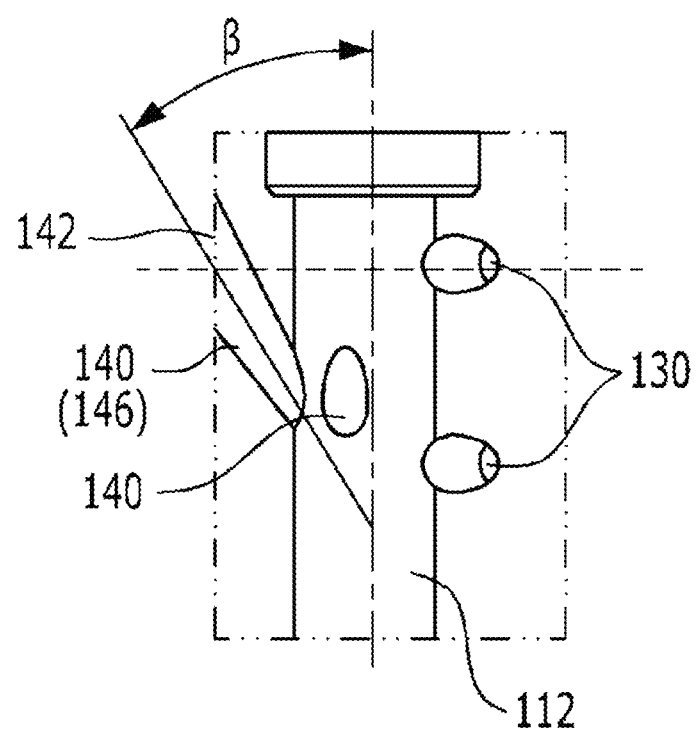
FIG. 7 is a cross-sectional view illustrating another exemplary embodiment of a V-shaped nozzle hole.

The V-shaped nozzle hole 140 may be configured as straight hole 144 having a constant cross-sectional area, as illustrated in FIGS. 4 to 6. Although this configuration is general, as illustrated in FIG. 7, the nozzle hole may be configured as a diffuser hole 146, a cross-section of which gradually increases towards the outlet 142. The diffuser hole 146 may promote the air-fuel ratio compensation effect in a wider area by spreading the distribution of fuel injected from the outlet 142 widely.

Figure 8:
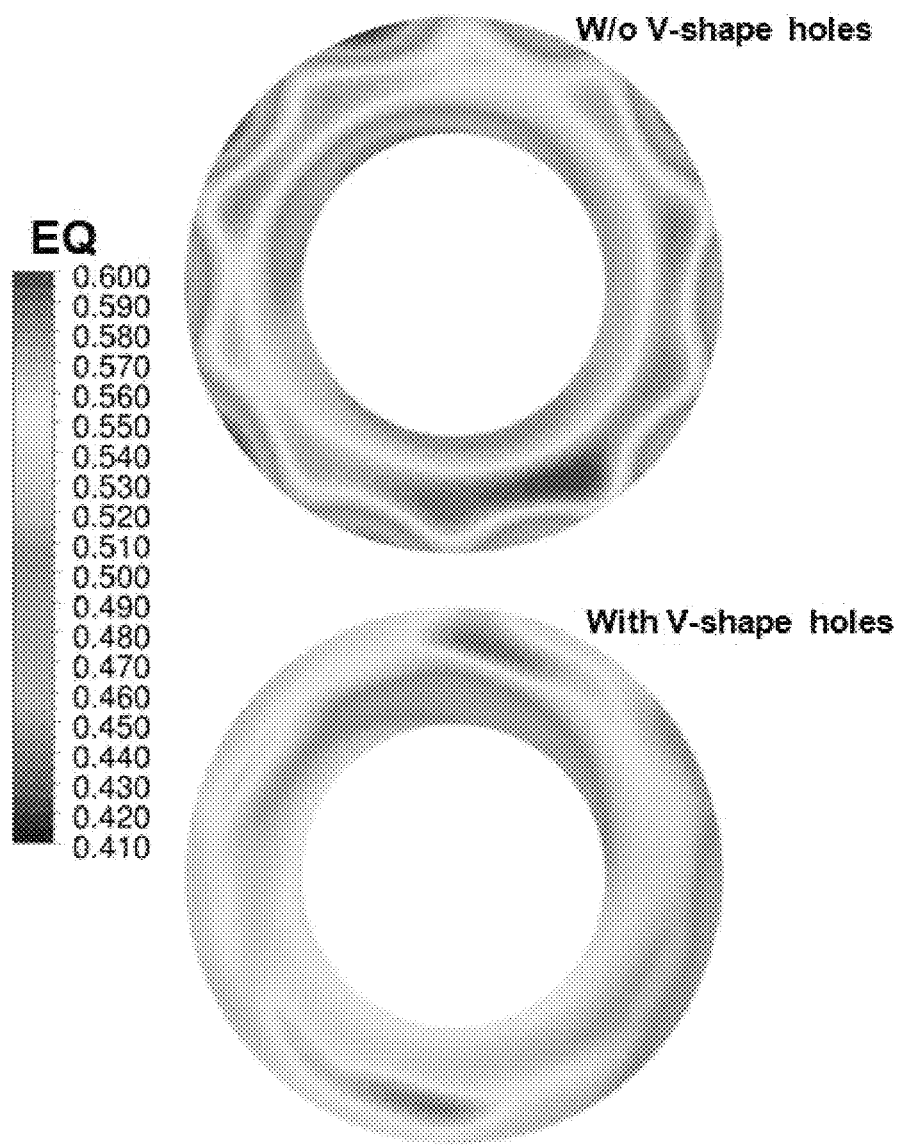
FIG. 8 is a view illustrating a circumferential air-fuel ratio distribution at an outlet of an annular space between a shroud and a combustor nozzle with or without V-shaped nozzle hole.
Figure 9:
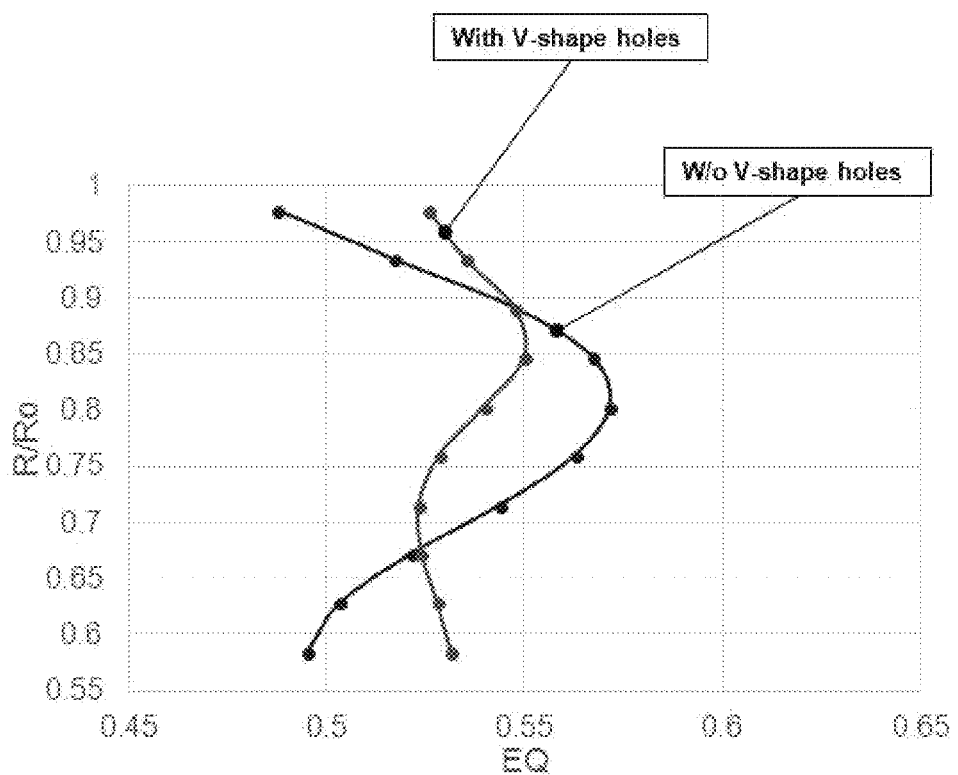
FIG. 9 is a view illustrating a radial air-fuel ratio profile corresponding to the circumferential air-fuel ratio distribution of FIG. 8.

FIG. 8 is a view illustrating the circumferential air-fuel ratio distribution at an outlet of an annular space between a shroud and a combustor nozzle with or without V-shaped nozzle hole, and FIG. 9 is a view illustrating a radial air-fuel ratio profile corresponding to the circumferential air-fuel ratio distribution of FIG. 8.

Referring to FIG. 8, in the related art combustor nozzle 100 without the V-shaped nozzle hole 140, it can be seen that regions having different air-fuel ratios are stratified like strips, and the air-fuel environment is particularly sparse in the region adjacent to the shroud 200. On the contrary, in the combustor nozzle 100 of the exemplary embodiment having the V-shaped nozzle hole 140, the premixed state is improved while the stratification of the air-fuel ratio distribution is alleviated, and the air-fuel ratio in the region adjacent to the shroud 200 is also richer.

In addition, according to the radial air-fuel ratio profile shown in FIG. 9 (e.g., the vertical axis variable is a dimensionless R/Ro value with respect to the radius), an amplitude (i.e., deviation) between the minimum and maximum values of the air-fuel ratio in the radial direction is also significantly improved. This corresponds to the fact that the combustor nozzle 100 according to the exemplary embodiment having the V-shaped nozzle hole 140 mitigates stratification of the air-fuel ratio distribution compared to the related art.

As described above, a combustor 1200 for a gas turbine according to the exemplary embodiment includes a plurality of burners 1220 disposed along an annular combustor casing 1210, and each burner 1220 is disposed in a shroud 200 with a combustor nozzle 100 having a V-shaped nozzle hole.

While the exemplary embodiments have been described with reference to the accompanying drawings, it is to be understood by those skilled in the art that various modifications in form and details may be made therein without departing from the spirit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A burner for a gas turbine comprising:
a combustor nozzle formed in a substantially elongated shape and extending substantially parallel to a longitudinal axis of the burner, and a shroud surrounding the combustor nozzle to form an annular space between the combustor nozzle and the shroud,
wherein the annular space includes an upstream portion axially spaced from a downstream portion and provides a passage through which compressed air or a mixture of the compressed air and fuel passes from the upstream portion to the downstream portion, and
a plurality of vanes disposed radially in the annular space,
wherein each vane of the plurality of vanes includes an airfoil including a leading edge facing the upstream portion; has a cavity to which the fuel is supplied from the combustor nozzle; and has a bottom side substantially perpendicular to the leading edge and attached to an outer circumferential surface of the combustor nozzle and a top side substantially perpendicular to the leading edge and attached to an inner circumferential surface of the shroud,
wherein the each vane includes a plurality of first nozzle holes communicating with the cavity and disposed in at least one of a pressure surface and/or a suction surface of the airfoil along an imaginary line in a height direction of the each vane, wherein each of the plurality of first nozzle holes consists of an inlet in the cavity and an outlet on the pressure surface and/or the suction surface of the airfoil,
wherein the each vane further includes a pair of second nozzle holes having a pair of inlets in the cavity and a pair of outlets on both the pressure surface and the suction surface of the airfoil based on the leading edge of the airfoil to form a V-shape from the pair of inlets to the pair of outlets, wherein both outlets of the pair of outlets face the upstream portion to inject the fuel into the annular space, wherein the pair of second nozzle holes form an angle ($\alpha$) diverging outward with respect to a horizontal line crossing the leading edge in a horizontal direction, and form an acute angle ($\beta$) radially outward with respect to the imaginary line crossing the leading edge in a vertical direction perpendicular to the horizontal line, and
wherein both centers of the pair of outlets of the second nozzle holes are disposed at a position equal to or lower than a top point of the outlet of a radially outermost nozzle hole among the plurality of first nozzle holes.

2. The burner according to claim 1, wherein the pair of second nozzle holes form the acute angle ($\beta$) inclined to the shroud.

3. The burner according to claim 1, wherein the pair of outlets of the pair of second nozzle holes are symmetrical with respect to the leading edge.

4. The burner according to claim 1, wherein each of the pair of second nozzle holes is a straight hole having a constant cross section.

5. The burner according to claim 1, wherein each of the pair of second nozzle holes is a diffuser hole of which a cross section gradually increases toward the outlet.

6. The burner according to claim 1, wherein a center of the angle ($\alpha$) formed by the pair of second nozzle holes diverging outwards with respect to the horizontal line crossing the leading edge in the horizontal direction is located in the cavity, and two flow paths formed by the pair of outlets of the pair of second nozzle holes are separated from each other.

7. The burner according to claim 1, wherein the angle ($\alpha$) of the pair of second nozzle holes formed with respect to the horizontal line crossing the leading edge in the horizontal direction is in a range of 70 to 180 degrees.

8. The burner according to claim 1, wherein the acute angle ($\beta$) of the pair of second nozzle holes formed with respect to the vertical line crossing the leading edge in the vertical direction is in a range of 20 to 50 degrees.

9. The burner according to claim 1, wherein the angle ($\alpha$) of the pair of second nozzle holes formed with respect to the horizontal line crossing the leading edge in the horizontal direction is in a range of 70 to 180 degrees, and the acute angle ($\beta$) of the pair of second nozzle holes formed with respect to the vertical line crossing the leading edge in the vertical direction is in a range of 20 to 50 degrees.

10. A gas turbine comprising:
a combustor,
a combustor casing, and
a plurality of burners disposed along an inner circumference of the combustor casing, wherein each burner comprises:
a combustor nozzle formed in a substantially elongated shape and extending substantially parallel to a longitudinal axis of the burner, and a shroud surrounding the combustor nozzle to form an annular space between the combustor nozzle and the shroud,
wherein the annular space includes an upstream portion axially spaced from a downstream portion and provides a passage through which compressed air or a mixture of the compressed air and fuel passes from the upstream portion to the downstream portion, and
a plurality of vanes disposed radially in the annular space,
wherein each vane of the plurality of vanes includes an airfoil including a leading edge facing the upstream portion; has a cavity to which the fuel is supplied from the combustor nozzle; and has a bottom side substantially perpendicular to the leading edge and attached to an outer circumferential surface of the combustor nozzle and a top side substantially perpendicular to the leading edge and attached to an inner circumferential surface of the shroud, wherein the each vane includes a plurality of first nozzle holes communicating with the cavity and disposed in at least one of a pressure surface and/or a suction surface of the airfoil along an imaginary line in a height direction of the each vane, wherein each of the plurality of first nozzle holes consists of an inlet in the cavity and an outlet on the pressure surface and/or the suction surface of the airfoil, wherein the each vane further includes a pair of second nozzle holes having a pair of inlets in the cavity and a pair of outlets on both the pressure surface and the suction surface of the airfoil based on the leading edge of the airfoil to form a V-shape from the pair of inlets to the pair of outlets, wherein both outlets of the pair of outlets face the upstream portion to inject the fuel into the annular space, wherein the pair of second nozzle holes form an angle ($\alpha$) diverging outward with respect to a horizontal line crossing the leading edge in a horizontal direction, and form an acute angle ($\beta$) radially outward with respect to the imaginary line crossing the leading edge in a vertical direction perpendicular to the horizontal line, and wherein both centers of the pair of outlets of the second nozzle holes are disposed at a position equal to or lower than a top point of the outlet of a radially outermost nozzle hole among the plurality of first nozzle holes.

11. The gas turbine according to claim 10, wherein the pair of second nozzle holes form the acute angle ($\beta$) inclined to the shroud.

12. The gas turbine according to claim 10, wherein the pair of outlets of the pair of second nozzle holes are symmetrical with respect to the leading edge.

13. The gas turbine according to claim 10, wherein each of the pair of second nozzle holes is a straight hole having a constant cross section.

14. The gas turbine according to claim 10, wherein the each of the pair of second nozzle holes is a diffuser hole of which a cross section gradually increases towards the outlet.

15. The gas turbine according to claim 10, wherein a center of the angle ($\alpha$) formed by the pair of second nozzle holes diverging outwards with respect to the horizontal line crossing the leading edge in the horizontal direction is located in the cavity, and two flow paths formed by the pair of outlets of the pair of second_nozzle holes are separated from each other.

16. The gas turbine according to claim 10, wherein the angle ($\alpha$) of the pair of second-nozzle holes formed with respect to the horizontal line crossing the leading edge in the horizontal direction is in a range of 70 to 180 degrees.

17. The gas turbine according to claim 10, wherein the acute angle ($\beta$) of the pair of second nozzle holes formed with respect to the vertical line crossing the leading edge in the horizontal direction is in a range of 20 to 50 degrees.

18. The gas turbine according to claim 10, wherein the angle ($\alpha$) of the pair of second nozzle holes formed with respect to the horizontal line crossing the leading edge in the horizontal direction is in a range of 70 to 180 degrees, and the acute angle ($\beta$) of the pair of second nozzle holes formed with respect to the vertical line crossing the leading edge in the vertical direction is in a range of 20 to 50 degrees.

* * * * *